United States Patent [19]

Phillips et al.

[11] Patent Number: 4,949,206
[45] Date of Patent: Aug. 14, 1990

[54] CRASH STOP FOR ROTARY DISK DRIVE ACTUATOR

[75] Inventors: Wayne Phillips, Arvada; David Normen, Boulder; Richard Rupp, Berthoud, all of Colo.

[73] Assignee: MiniScribe Corporation, Longmont, Colo.

[21] Appl. No.: 226,280

[22] Filed: Jul. 29, 1988

[51] Int. Cl.[5] .............................................. G11B 5/55
[52] U.S. Cl. .................................. 360/106; 360/97.01
[58] Field of Search ..................... 360/106, 104, 97.01, 360/99.01, 109

[56] References Cited

U.S. PATENT DOCUMENTS

| | | | |
|---|---|---|---|
| 4,110,802 | 8/1978 | Ho et al. | 360/106 |
| 4,237,504 | 12/1980 | Ho et al. | 360/106 |
| 4,346,416 | 8/1982 | Riggle et al. | 360/106 |
| 4,439,792 | 3/1984 | Van de Bult | 360/106 |
| 4,471,396 | 9/1984 | Iftikar et al. | 360/106 |
| 4,603,363 | 7/1986 | Rickert et al. | 360/97.01 |
| 4,635,151 | 1/1987 | Hazebrouck | 360/105 |
| 4,716,482 | 12/1987 | Walsh | 360/106 |
| 4,796,131 | 1/1989 | Chang | 360/106 |

Primary Examiner—David J. Severin
Attorney, Agent, or Firm—Curtis, Morris & Safford

[57] ABSTRACT

An apparatus for supporting a read/write head at a selected one of a plurality of substantially circular, concrete data tracks and for absorbing the rebound shock of a rotary actuator, the apparatus including a head actuator assembly having at least one read/write head mounted thereon, an actuator housing, and a stationary coil coupled to the head actuator. At least one permanent magnet is fixedly mounted relative to the head actuator. Upper and lower magnetic plates support the permanent magnet and each has at least two cavities which are substantially aligned with, but displaced off-axis from, the cavities of the other plate. At least two crash stops are provided, one to limit pivoting movement of the head actuator at the inner diameter of the hard disk and the other to limit movement of the head actuator at the outer disk diameter. Each of the crash stops is insertably retained within the corresponding cavities of the magnetic plates to preload the crash stops to provide a stopping force immediately upon impact with the carriage. Each crash stop is formed as a steel pin and includes a central generally cylindrical material which reduces the rebound shock of the head actuator after it strikes either of the crash stops.

19 Claims, 6 Drawing Sheets

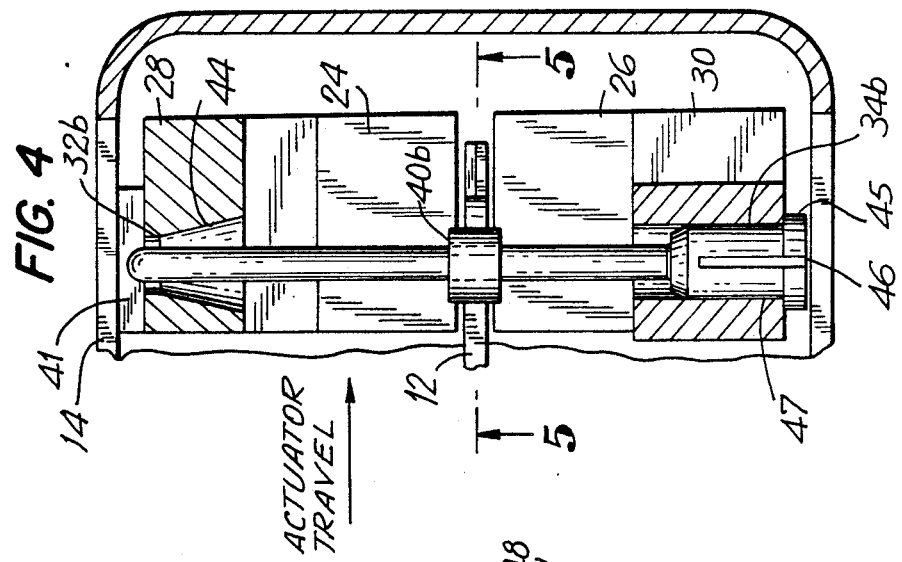
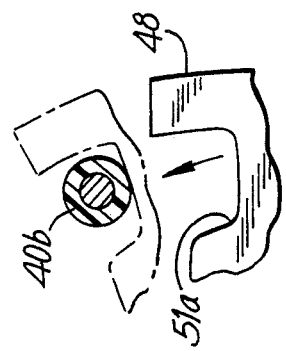
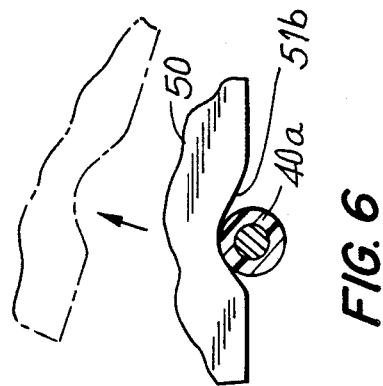

CRASH STOP FOR ROTARY DISK DRIVE ACTUATOR

FIELD OF THE INVENTION

This invention relates generally to rotary actuators for use in magnetic disk drives, and more particularly, the invention relates to a crash stop for use in a rotary actuator.

BACKGROUND OF THE INVENTION

In a rotary actuator disk drive system, data is recorded on and/or reproduced from a plurality of substantially circular, concentric data tracks or disks. A head actuator is provided upon which a plurality of read/write heads are mounted, and the head actuator is pivotally mounted in an actuator housing by means of a shaft assembly for moving the heads along bi-directional, arcuate paths over their respective disks to position the heads at selected tracks.

Unfortunately, it is possible for an electrical failure, in the servo controller or related circuitry, to cause the actuator to move at full speed in either direction of travel. If this occurs, and some mechanism is not provided to stop the actuator during such a failure, the actuator will "crash" into the mechanical limit of its travel. Such a crash may not only seriously damage the actuator mechanism, but may also result in excessive deceleration, causing the read/write heads, which are positioned very close to the disk surface, to strike the disk surface, thereby causing damage to both the heads and the disk surface.

In the event of such an electrical failure, an emergency mechanical apparatus is necessary to stop the travel of the accessing mechanism in a controlled manner to avoid damage to the actuator, the heads or the disk file. That is, the deceleration of the actuator should not exceed a certain maximum.

In prior art systems, two stop mechanisms were generally spaced at each limit position of the actuator or alternately at limit positions of some other component of the accessing mechanism. Generally, the crash stops were not preloaded and thus there was no initial stopping force. A preloaded crash stop is also known to provide an immediate stopping force on contact with the actuator. Ideally, the crash stop is a solid piece of material (e.g. steel); but this produces a large rebound shock, that is, a large deceleration, on the pivoting actuator carriage on initial contact which could damage the head suspension mounted on the carriage.

Therefore, most prior art implementations have been in the form of elastomeric bumpers. These have the disadvantage of requiring a significant amount of disk space because (1) the crash stop is not preloaded, hence a larger deflection is required for a given limit on actuator deceleration, and (2) space must be provided to accommodate variations in crash stop location due to tolerance variations in the parts from which the disk drive system is assembled.

OBJECTS OF THE INVENTION

Accordingly, it is an object of the present invention to provide a disk drive system which avoids the above-described difficulties of the prior art.

It is another object of the present invention to provide a crash stop system for a rotary actuator disk drive actuator.

It is a further object of the present invention to provide a crash stop system for a rotary actuator disk drive actuator which is preloaded to decrease the deflections necessary to maintain a given limit on actuator deceleration.

It is another object of this invention to provide a crash stop system for a rotary disk drive actuator wherein the crash stop includes elastomeric bumpers along a central cylindrical section thereof to absorb initial large rebound shocks encountered when the actuator impacts the crash stop.

It is yet a further object of the present invention to provide a crash stop system wherein the crash stop includes elastomeric bumpers mounted eccentrically along a central cylindrical section thereof, with the cylindrical section being rotatable to permit adjustment of the location of the crash stop point of contact.

It is another object of this invention to provide a crash stop system wherein the crash stop is insertable and removable from the outside of the casing of the disk drive system.

It is yet another object of this invention to provide a crash stop system wherein the crash stop includes elastomeric bumpers mounted on a rotatable cylindrical section with external access so that the crash stop location can be adjusted from outside the drive.

The present invention is directed toward solving these problems and provides a workable and economical solution to them. The new invention disclosed and claimed in subsequent sections of this application is fundamentally different from all known prior art crash stop systems for rotary disk drive actuators.

SUMMARY OF THE INVENTION

In accordance with an aspect of the present invention, an apparatus is provided for supporting a read/write head at a selected one of a plurality of substantially circular, concentric data tracks, and more particularly to a crash stop which is preloaded and absorbs the rebound shocks of the rotary actuator during impact with the crash stop. The apparatus comprises head actuator means having at least one read/write head mounted thereon, an actuator housing, and a support bracket for coupling a coil to the head actuator. In addition, this apparatus includes at least one permanent magnet fixedly mounted relative to the head actuator and supported between upper and lower magnetic plates of the disk drive system between which the coil moves. Upper and lower plates of the apparatus, which may be the upper and lower magnetic plates, have at least two cavities which are substantially aligned with, but displaced off-axis from, the cavities of the other plate.

At least two crash stops, one to limit pivoting movement of the head actuator at the inner diameter of the hard disk and another to limit movement of the head actuator at the outer disk diameter are provided. Each crash stop is insertably retained within the corresponding cavities of the magnetic plate to preload said crash stops. The crash stops are preloaded as a result of the cavities of the upper plate and the corresponding cavities of the lower plate not being in exact alignment with one another, and accordingly when the crash stops are inserted therein, each crash stop binds or curves to preload the crash stop. Each crash stop includes a splined top that expands as a plate mounting fastener is inserted therein thereby clamping the top of the crash stop within one of the plates.

The crash stop is formed generally of a pin formed of a spring material, advantageously steel, and includes a central, generally cylindrical section formed of an elastomeric material, preferably urethane or rubber. This central section absorbs the large initial rebound shock associated with the actutor striking a crash stop formed of a solid piece of material. The section is not completely cylindrical, but rather has an eccentric cam surface. The degree of preloading may therefore be adjusted at either the inner or outer diameter by rotating the inner or outer crash stop, respectively.

Abutment members extend outwardly on either side of the stationary coil support bracket. These abutment members are engageable with the central cylindrical section thereby impacting upon the elastomeric material at the outer and inner limits of movement of the actuator. As such, the rebound shock of the head actuator is reduced after the abutment member strikes the central section of either of the inner and outer diameter crash stops.

BRIEF DESCRIPTION OF THE DRAWINGS

FIG. 4 is a side sectional view taken along line 4—4 of FIG. 3;

FIG. 5 is a bottom elevational view taken along line 5—5 of FIG. 4;

FIG. 6 is a bottom elevational view taken along line 6—6 of FIG. 1;

DETAILED DESCRIPTION OF THE PREFERRED EMBODIMENT

Figure 1:
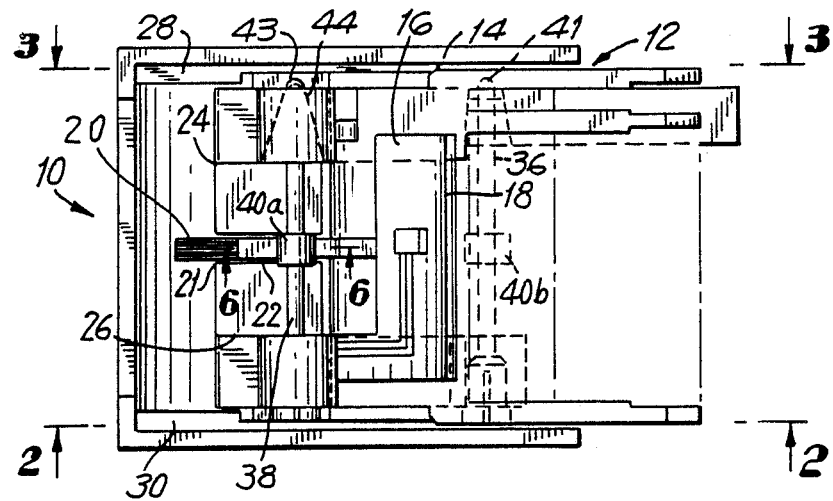
FIG. 1 is a side sectional view of a preferred embodiment of the apparatus in accordance with the present invention.

Turning now to the drawings and initially to FIG. 1 thereof, the disk drive system 10 in accordance with the present invention includes a head actuator 12 upon which the read/write heads (not illustrated) are mounted, an actuator housing 14 and a shaft assembly 16 including a shaft 18. Shaft assembly 16 is mounted on actuator housing 14 by conventional means (not illustrated). Head actuator 12 is mounted in turn on shaft assembly 16 so as to be pivotally mounted to actuator housing 14 and thereby be capable of moving the read/write heads in bi-directional, arcuate paths across the disks.

A coil 20 is mechanically coupled to actuator 12 at rearward end 21 of the actuator on a support bracket 22. It will be appreciated that the coil moves with the rotary movement of actuator 12.

Two magnets 24 and 26 are fixedly mounted with respect to the actuator 12. By securing the magnets to the upper and lower magnetic plates 28 and 30 respectively, it is appreciated that magnets 24 and 26 are fixed as actuator 12, rotates about shaft 18.

Figure 2:
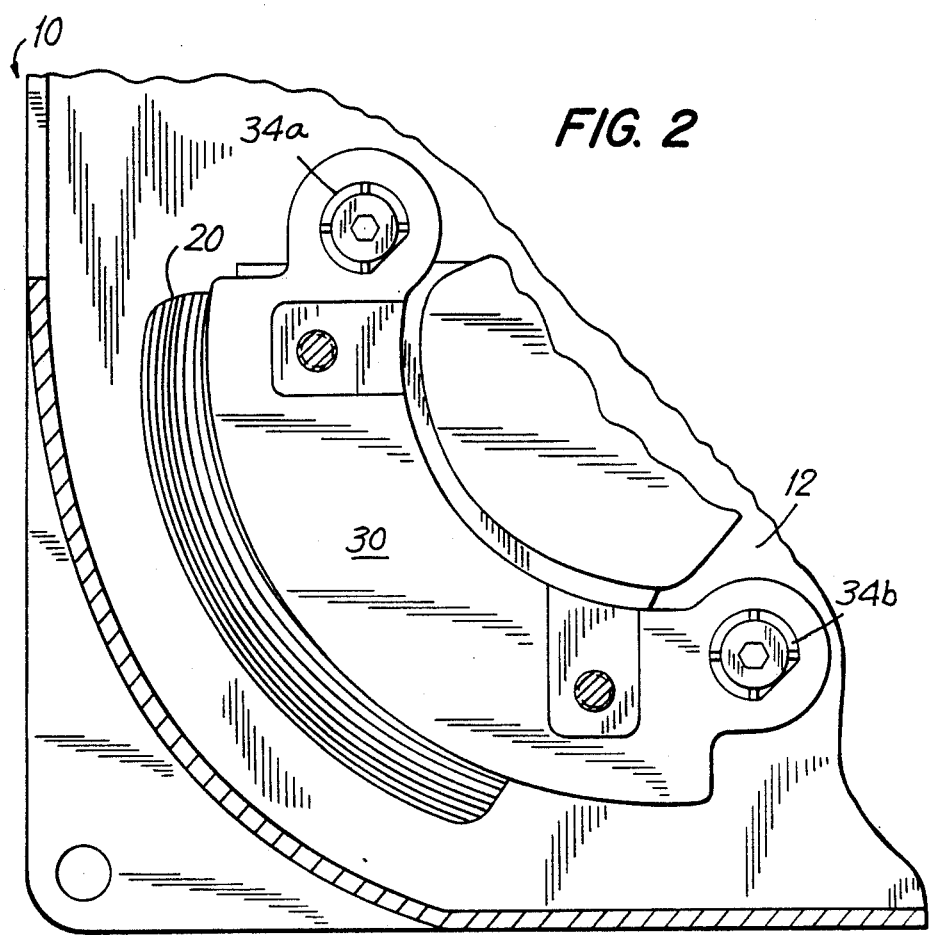
FIG. 2 is a bottom elevational view taken along the line 2—2 of FIG. 1.
Figure 3:
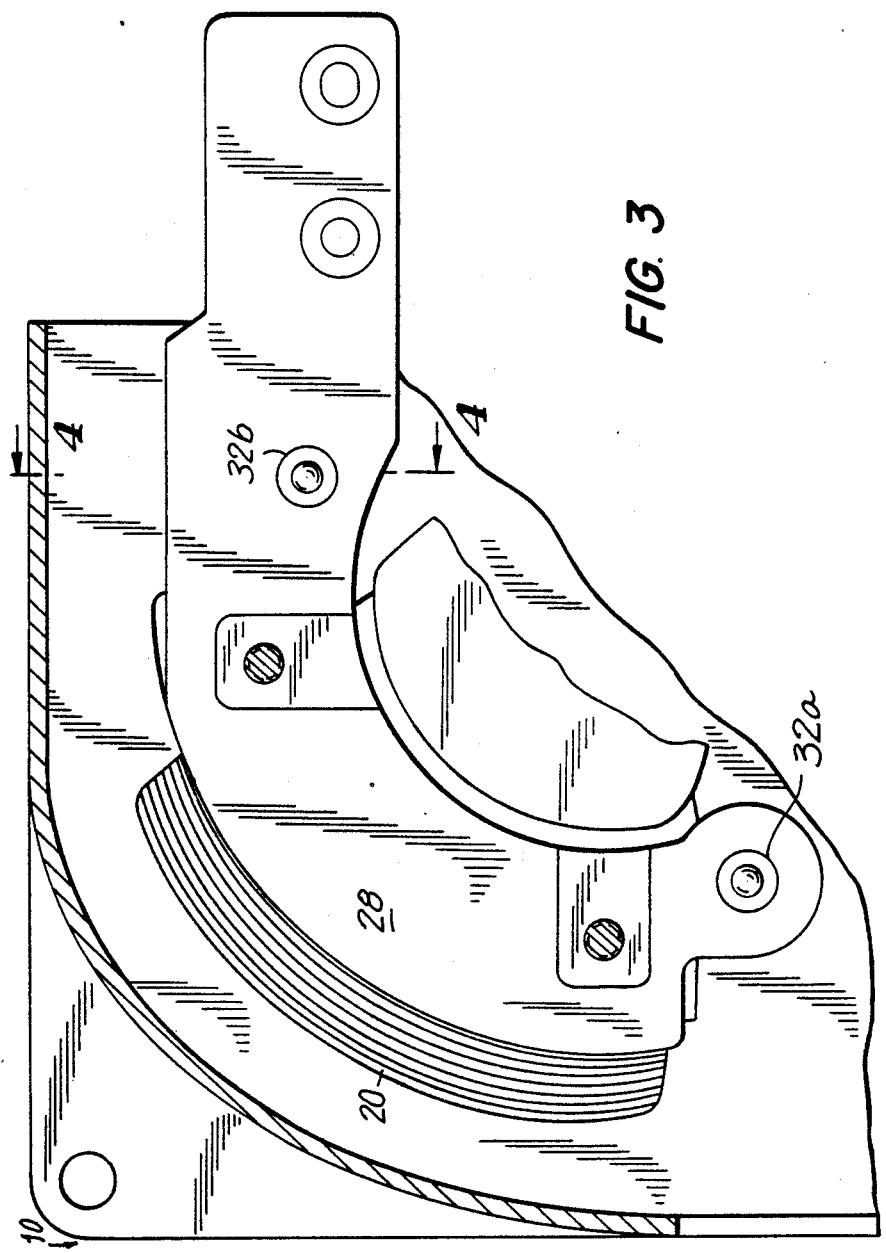
FIG. 3 is a top elevational view taken along line 3—3 of FIG. 1.

The upper and lower magnetic plates 28 and 30 are more specifically shown in FIGS. 2–4. The upper magnetic plate 28 includes two cavities 32a and 32b (FIG. 3), while lower magnetic plate 30 includes cavities 34a and 34b (FIG. 2). In other embodiments, cavities 32a, 32b, 34a and 34b may be located in other fixed upper and lower plates. As shown in FIG. 4, cavity 32b of upper magnetic plate 28 is substantially aligned with, but slightly displaced off-axis from, cavity 34b of lower magnetic plate 30. The displacement of cavity 32b is in the direction away from actuator travel; i.e. it is farther from the inner diameter of the hard disk than cavity 34b is. Similarly, cavity 32a of upper magnetic plate 28 is substantially aligned with, but slightly displaced off-axis from, cavity 34b of lower magnetic plate 30. The displacement of cavity 32a is also in a direction away from actuator travel, which here is opposite the direction of displacement of cavity 32b, so that cavity 32a is further from the outer diameter of the hard disk than cavity 34a is.

As shown in FIGS. 1–4, at least two crash stops 36 and 38 are provided. Inner diameter crash stop 36 limits pivoting movement of the actuator at the inner diameter of the hard disk. Outer diameter crash stop 38 limits movement of the actuator at the outer disk diameter. In order to provide a stopping force immediately upon impact with the actuator carriage, crash stops 36 and 38 are preloaded. This is accomplished by each crash stop being insertably retained within the corresponding cavities of the magnetic plates. As is shown in FIG. 1, inner diameter crash stop 36 is insertably received and retained within cavity 32a of upper magnetic plate and 34a of lower magnetic plate. Similarly, outer diameter crash stop 38 is insertably received and retained within cavity 32b of upper magnetic plate and 34b of lower magnetic plate. Since cavities 32a and 34a and cavities 32b and 34b are not in exact alignment with one another, when the crash stops 36 and 38 are insertably retained therein, each crash stop bends or curves in the direction of actuator 12 travel to preload each of the crash stops. The angle of the pin between upper and lower cavities thus functions to preload the pin.

Each crash stop 36 and 38 is formed of a solid piece of spring material (e.g. steel); but this in and of itself produces a large rebound shock on the pivoting actuator 12 on initial contact with the crash stops, which shock could damage the head suspension mounted on the carriage. In accordance with one of the general objects of this invention, crash stops 36 and 38 each include a central generally cylindrical section 40a and 40b, respectively, formed of an elastomeric material such as rubber or urethane. This elastomeric bumper on the crash stop absorbs the large deceleration spike which is produced when the actuator mechanism impacts upon the solid piece of material of the crash stop.

The free end 41 of inner diameter crash stop 36 is inserted through cavity 34b from the outside of disk drive 10 and is received within a cone-shaped section 42 of cavity 34a of the upper magnetic plate. Free end 43 of outer diameter crash stop 38 is inserted through cavity 34a from the outside of disk drive 10 and is received within cone-shaped section 44 of cavity 32b of the upper magnetic plate. The free ends 41, 43 slide along the inner surfaces of the respective cone-shaped sections 42, 44, which displace the free ends 41, 43 outwardly to cause the inward bowing of crash stops 36, 38 towards actuator 12 as described above and shown in FIG. 4. These cone-shaped sections 42 and 44, which are displaced from the axes of cavities 34a, 34b, thus preload the crash stops 36, 38 by bending them, which provides a resilient force when the actuator abuts against either of the crash stops. When actuator 12 impacts against the central cylindrical sections 40a, 40b of each of the crash stops, the crash stop pin provides a preloaded stopping force as it is displaced and then returned to its illustrated or rest position.

The present design provides for the clamping of the top of the crash stop within one of the magnetic plates. As is shown in FIGS. 1 and 4, the inner diameter crash stop 36 includes a splined top 45 that expands as a plate fastener 46 is inserted therein from the outside of disk drive 10, thereby clamping the top section 37 of crash stop 36 within lower magnetic plate 30. Similarly, the splined top of the outer diameter crash stop 38 is clamped to the upper magnetic plate 28 (not shown). The splined top of crash stop 38 is provided within cavity 32a and expands as another plate fastener is inserted therein thereby clamping the top section of the outer diameter crash stop 38 within the upper magnetic plate 28. Of course, other means besides the splined tops may be alternatively employed to lock the crash stops in position. The crash stop system of this invention provides for the reliable clamping of the crash stops within the structure of the magnetic plates.

As shown in FIGS. 5 and 6, sections 40a and 40b are not exactly cylindrical in cross-section, but rather have eccentric cam surfaces. Ideally, the sections 40a, 40b should contact actuator 12 only a few cylinders (tracks) beyond the last data track. In order to precisely position the point of contact, crash stops 36, 38 may be inserted through cavities 34a, 34b and into cavities 32a, 32b, but before they are locked in placed by, for example, the spline tops, crash stops 36, 38 may be rotated to position the respective cam surface at the desired point of contact.

It will be noted that this structure permits the crash stops 36, 38 to be accessed for rotation from outside the disk drive system 10 by the insertion of a rotating tool, such as a screwdriver, into the splined tops. The fact that the crash stops 36, 38 are externally insertable, externally adjustable and externally lockable constitutes an advantageous feature of the present invention, given the small sizes of rotary actuator disk drive systems and the closeness of the tolerances therein.

As is shown in FIGS. 1, 4-6, abutment members 48 and 50 are provided on each side of the support bracket 22 for coil 20. Abutment member 48 extends outwardly of support bracket 22 and is engageable with the central cylindrical portion 40a to reduce the rebound shock of the head actuator after it strikes the inner diameter crash stop 36. Abutment member 50 extends outwardly from support bracket 22 and is engageable toward the central cylindrical section 40b of the outer diameter crash stop 38 to reduce the rebound shock of the head actuator after it strikes the outer diameter crash stop. Each of the abutment members 48 and 50 includes a recessed opening 51a and 51b, respectively, which are capable of abutting against the crash stops 36 and 38, respectively. Furthermore, in order to engage the crash stops at the limits of movement of the rotary actuator, the abutment members 48 and 50 extend outwardly of the support bracket 22. Since the limit of movements of the head actuator between the inner track and outer track varies, the abutment member 48 has a larger recess 51a than recess 51b of abutment member 50.

Figure 7:
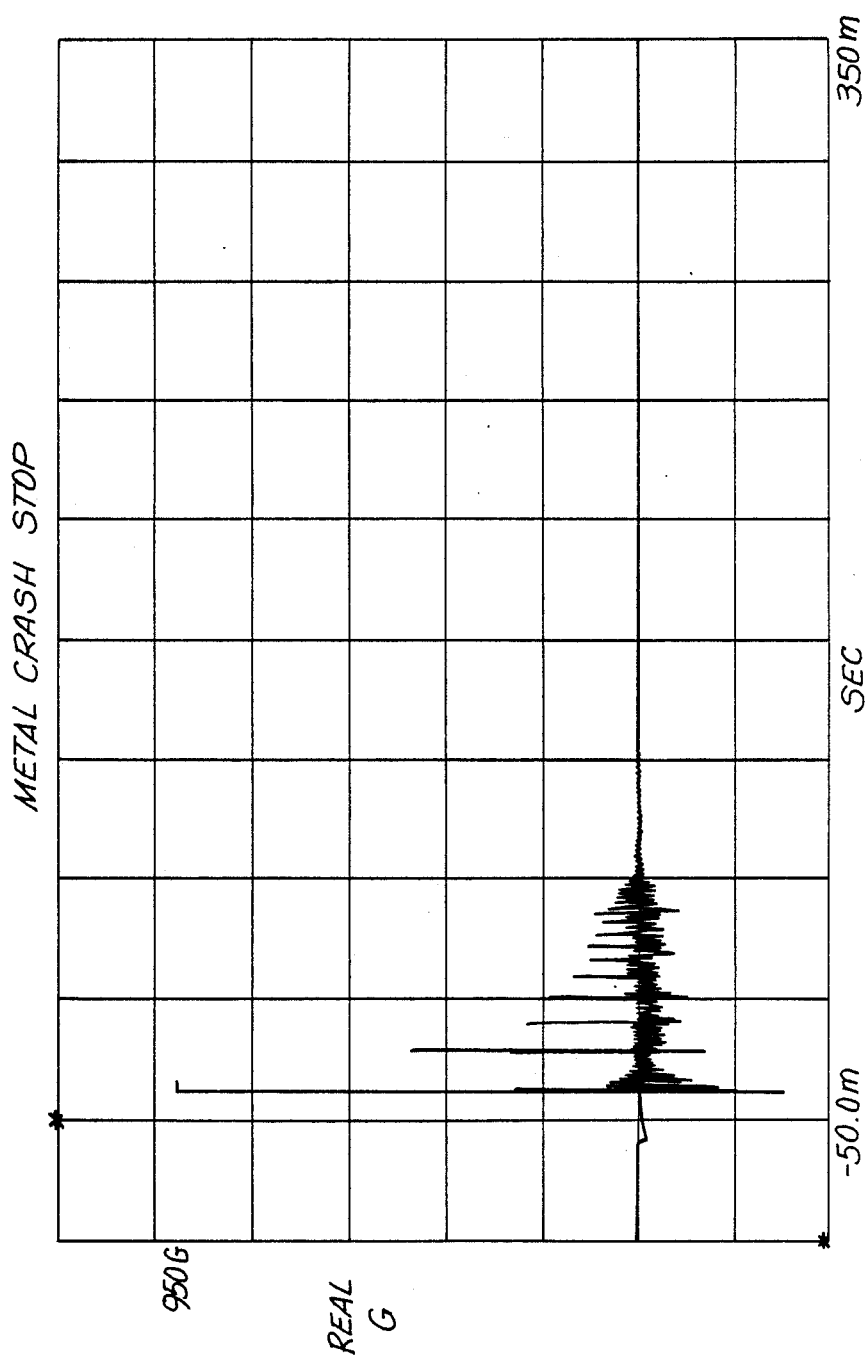
FIG. 7 is a graph representing the deceleration to which the read/write heads are subject v. time when an actuator impacts upon a prior art metal crash stop.
Figure 8:
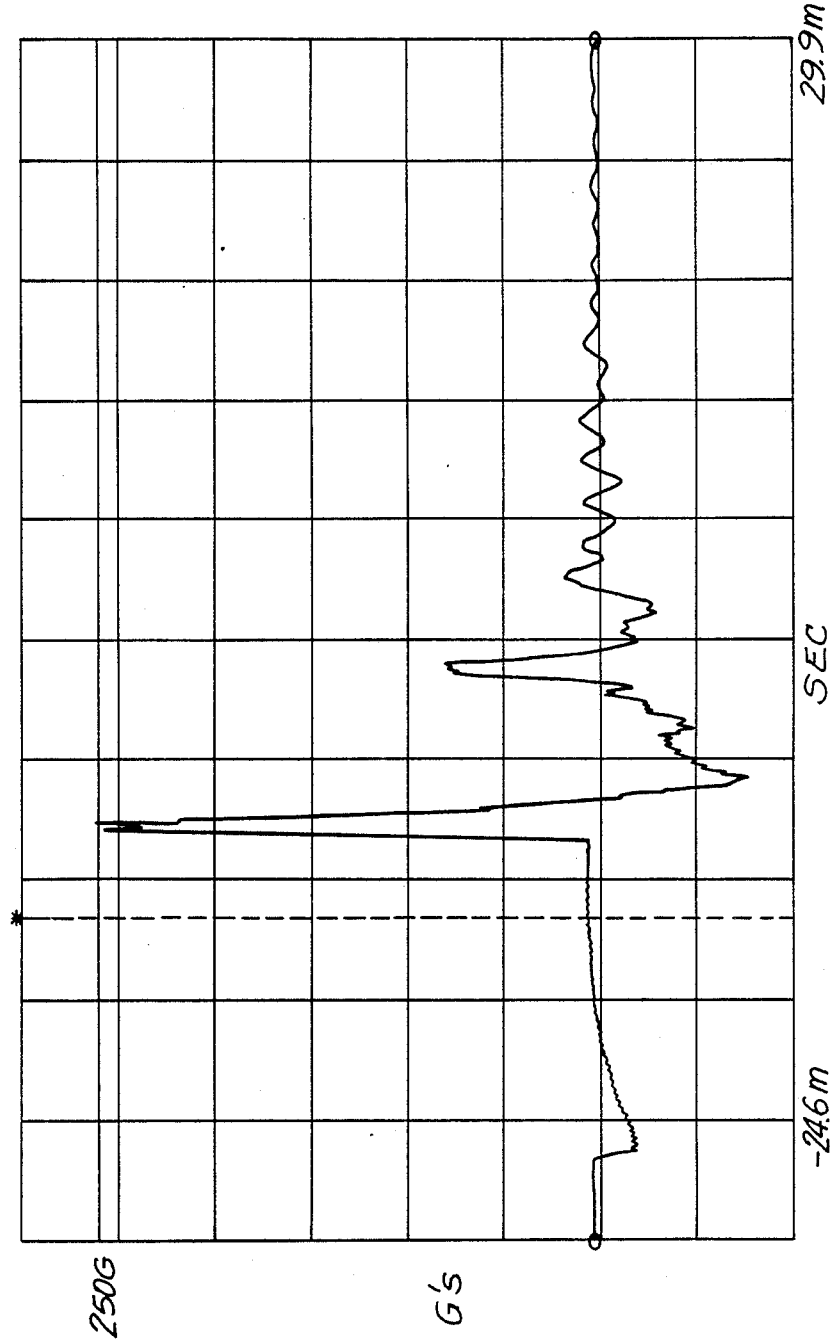
FIG. 8 is a graph representing the deceleration to which the read/write heads are subjected v. time when the actuator impacts upon the crash stop of the present invention.

The advantages of the crash stop of this invention are illustrated in FIGS. 7, 8, 9 and 10. FIG. 7 represents the deceleration applied to the read/write heads during an emergency crash situation wherein a purely metal crash stop is employed. As can be seen in FIG. 7, if the crash stop is a solid piece of material, a large rebound shock is produced on the pivoting actuator carriage on initial contact with the crash stop which could damage the head suspension mounted on the carriage. With the present invention, this shock is absorbed (see FIG. 8) by utilizing the elastomeric material in the central cylindrical member of the crash stops. As such, not only is the crash stop of the present invention preloaded to provide a stopping force immediately upon impact with the carriage, but it is also capable of absorbing the large rebound shock associated with a crash stop being a solid piece of material.

Figure 9:
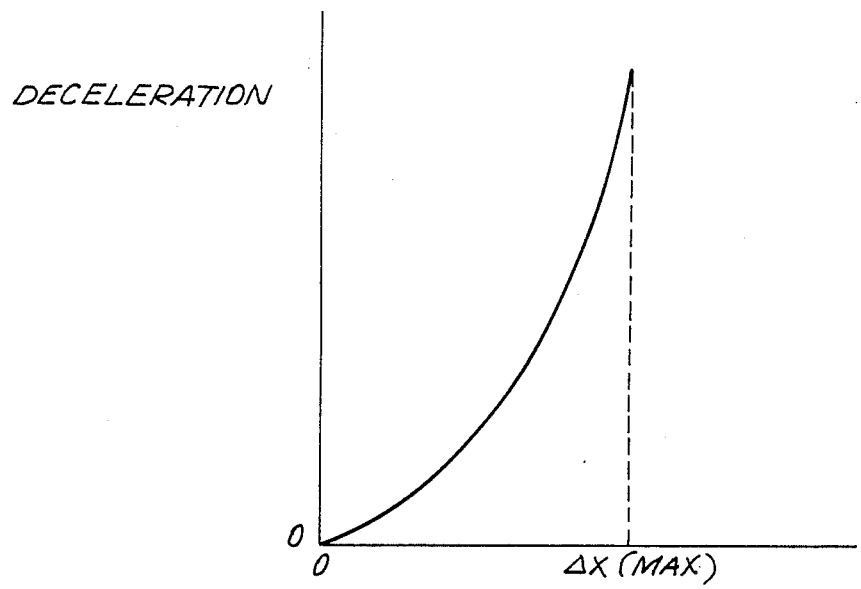
FIG. 9 is a schematic plot of deceleration v. deflection when an actuator impacts on a non-preloaded crash stop having an elastomeric bumper.

Furthermore, as shown in FIG. 9, a non-preloaded crash stop with an elastomeric bumper is inefficient and disadvantageous in that a relatively large deflection of the crash stop is required before a significant deceleration force is applied. The energy required to stop the actuator, which is equal to the kinetic energy of the actuator on impact, is proportional to the area under the curve up to the deflection at which the actuator is stopped. As may be seen, almost no deceleration is applied over small deflections. Therefore, for an actuator having a particular kinetic energy, either the allowable deflection must be large, which wastes space and reduces the area on the hard disk for data storage, or the deceleration must rise rapidly to a high value at the maximum allowed deflection so that the area under the curve (the stopping energy) is great enough. As pointed out above, however, a deceleration which is too large will cause the heads to crash to the surface of the hard disk.

Figure 10:
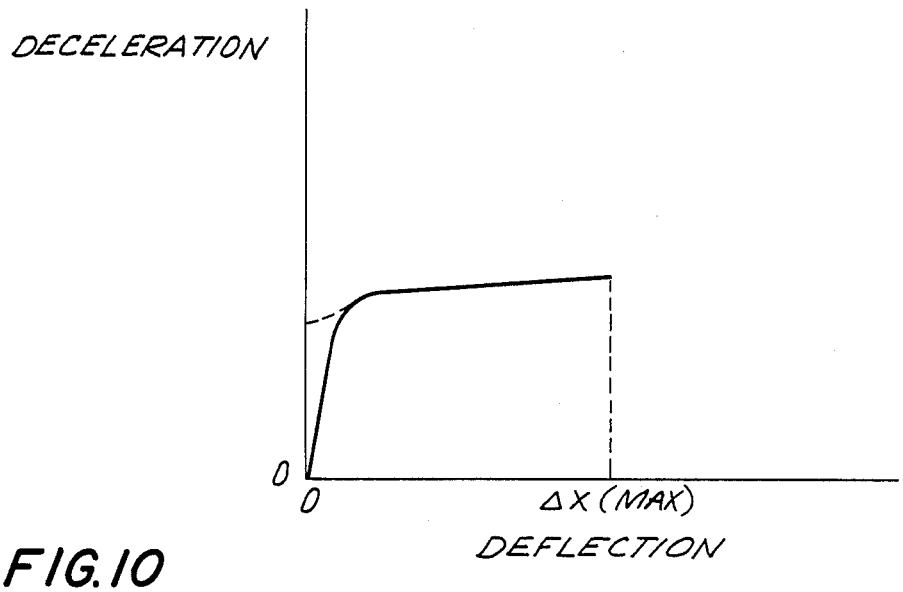
FIG. 10 is a schematic plot of deceleration v. deflection when the actuator impacts on the crash stop of the present invention.

FIG. 10 illustrates in solid line that the crash stop in accordance with the present invention avoids this difficulty by providing significant deceleration even at small deflections. As a result, even if the maximum allowable deflection is limited, the area under the curve will be great enough without requiring the deflection to rise above a safe threshold. Indeed, as shown in dashed line, if the elastomeric section were not provided, significant deceleration would begin immediately on impact. The section is provided, however, to remove the spike shown in FIG. & and does not significantly increase the required deflection.

While the present invention has been particularly shown and described with reference to preferred embodiments, it will be readily apparent to those of ordinary skill in the art that various changes and modifications may be made without departing from the spirit and scope of the invention as defined in the appended claims.

What is claimed is:

1. In a rotary disk drive system, apparatus for supporting a read/write head at a selected one of a plurality of substantially circular, concentric data tracks, said apparatus comprising:
   head actuator means having at least one read/write head mounted thereon;
   an actuator housing;
   means for coupling a coil to said head actuator means;

at least one permanent magnet fixedly mounted with respect to said head actuator means;

upper and lower magnetic plates supporting said at least one permanent magnet and each having at least two cavities which are substantially aligned with, but displaced off-axis from, the cavities of the other plate;

an inner diameter and an outer diameter crash stop being insertably retained within the corresponding cavities of the magnetic plates to preload the crash stops to provide a stopping force immediately upon impact with the head actuator means, each said crash stop having a central generally cylindrical section of elastomeric material; and engaging means operatively connected to said coupling means and engageable with said central cylindrical sections to reduce the rebound shock of said head actuator means after it strikes either of said inner and outer diameter crash stops.

2. Apparatus as set forth in claim 1 wherein said central generally cylindrical section are formed of a rubber bumper.

3. Apparatus as set forth in claim 1 wherein each said cavity of said upper magnetic plate includes a cone-shaped section which receives a free end of the respective crash stop to deflect said respective crash stop in the direction of actuator travel so as to preload said respective crash stop.

4. Apparatus as set forth in claim 1 wherein each said crash stop bends equally in the direction of actuator travel to preload said crash stop.

5. Apparatus as set forth in claim 1 wherein each said crash stop includes a splined top that expands as a plate fastening means is inserted therein thereby clamping the top of said crash stop within one of said magnetic plates.

6. Apparatus as set forth in claim 1 wherein said engaging means includes a recessed opening capable of abutting against one of said crash stops.

7. Apparatus as set forth in claim 1 wherein said engaging means extends outwardly of said coupling means.

8. Apparatus as set forth in claim 1 wherein each said crash stop is formed of a steel pin.

9. Apparatus as set forth in claim 1 wherein each said central section has an outer, eccentric cam surface, said crash stops being rotatable in said cavities to precisely position said cam surfaces and thereby the initial points of contact with said head actuator means.

10. Apparatus as set forth in claim 9, wherein said crash stops are externally accessible for rotation in said cavities.

11. In a rotary disk drive system, apparatus for supporting a read/write head at a selected one of a plurality of substantially circular, concentric data tracks and absorbing the rebound shock of a rotary actuator, said apparatus comprising:

head actuator means having at least one read/write head mounted thereon;

an actuator housing;

a base plate stationary with respect to said head actuator means;

upper and lower plates fixed with respect to said head actuator means and each having at least two cavities which are substantially aligned with, but displaced off-axis from, the cavities of the other plate;

at least two crash stops, one to limit pivoting movement of said head actuator means at the inner diameter of said hard disk and another to limit movement of said head actuator means at the outer disk diameter, each said crash stop being insertably retained within the corresponding cavities of said plates to preload said crash stops in the direction of actuator travel, each said crash stop having a central generally cylindrical section being defined by an elastomeric bumper; and engaging means operatively connected to said base plate and engageable with said central cylindrical sections to reduce the rebound shock of said head actuator means after it strikes either of said inner and outer diameter crash stops.

12. Apparatus as set forth in claim 11 wherein one cavity of said upper plate includes a cone-shaped section which receives a free end of the respective crash stop to deflect said respective crash stop in the direction of actuator travel so as to preload said respective crash stop.

13. Apparatus as set forth in claim 11 wherein each said crash stop includes a splined top that expands as a plate fastening means is inserted therein thereby clamping the top of said crash stop within one of said magnetic plates.

14. Apparatus as set forth in claim 11 wherein said engaging means includes a recessed opening capable of abutting against one of said crash stops.

15. Apparatus as set forth in claim 11 wherein said engaging means extends outwardly on said base plate.

16. Apparatus as set forth in claim 11 wherein each said crash stop is formed of a steel pin.

17. Apparatus as set forth in claim 11, wherein each said crash stop is inserted into said cavities from outside of said plates.

18. Apparatus as set forth in claim 11, wherein each said elastomeric bumper has an outer, eccentric cam surface, said crash stops being rotatable in the respective cavities to precisely position said cam surfaces and thereby the points of initial contact with said head actuator means.

19. Apparatus as set forth in claim 18, wherein each crash stop in the respective cavities is accessible from outside of said plates for rotation.

* * * * *